(12) United States Patent
Burt

(10) Patent No.: US 6,823,256 B1
(45) Date of Patent: Nov. 23, 2004

(54) METHOD FOR ASSOCIATING REAL-TIME INFORMATION WITH A GEOGRAPHICAL LOCATION

(75) Inventor: Wylie R. Burt, Plymouth, MI (US)

(73) Assignee: General Motors Corporation, Detroit, MI (US)

( * ) Notice: Subject to any disclaimer, the term of this patent is extended or adjusted under 35 U.S.C. 154(b) by 4 days.

(21) Appl. No.: 10/430,739

(22) Filed: May 6, 2003

(51) Int. Cl.[7] ............................................. G01C 21/26
(52) U.S. Cl. .................... 701/200; 701/66; 701/207; 701/214; 701/300; 342/357.01; 342/357.08
(58) Field of Search .................. 701/66, 200, 201, 701/207, 214, 300; 707/1, 101; 342/357.01, 357.08, 357.09

(56) References Cited

U.S. PATENT DOCUMENTS

| | | | |
|---|---|---|---|
| 5,640,468 A | * | 6/1997 | Hsu ............................ 382/190 |
| 5,781,762 A | * | 7/1998 | Steinman et al. ............. 703/21 |
| 6,236,365 B1 | * | 5/2001 | LeBlanc et al. ............ 342/457 |

* cited by examiner

Primary Examiner—Gertrude A. Jeanglaude
(74) Attorney, Agent, or Firm—Anthony Luke Simon

(57) ABSTRACT

A location of interest is received by a server, and a buffer zone is determined surrounding that location. Real-time spatial events may be continually updated in one or more GIS databases. The database entries may be software spatial objects, which consist of the location and supplemental information pertaining to each event. All locations that are related to a spatial event may be listed in a relationship table. The location of interest is used to query the relationship table for events occurring within the location's buffer zone, and therefore affecting the location.

18 Claims, 6 Drawing Sheets

METHOD FOR ASSOCIATING REAL-TIME INFORMATION WITH A GEOGRAPHICAL LOCATION

FIELD OF THE INVENTION

In general, the invention relates to database querying. More specifically, the invention relates to searching and collecting information from multiple databases and in particular, to a method associating real-time information with a geographical location.

BACKGROUND OF THE INVENTION

Currently Geographic Information Systems (GIS) exist which collect spatial information pertaining to regional areas. The information is generally available in layers containing different types of information such as elevation, roads, population, structures, land features, and many statistics and demographics pertaining to a particular region. Many governmental and commercial servers exist to provide this information. Some GIS servers collect and update real-time information that may be useful for travel and other planning. However, most of these servers are separate from one another and must be queried individually.

In order to relate spatial events to a location, it is currently possible to use a relationship table provided by a data supplier, but that would require the restriction of only using that data supplier's database. Different data suppliers may possess differing amounts and types of data. The benefit of using multiple data suppliers is that accuracy can be increased by locating a greater number of real-time spatial events. Much of the real-time information currently available is stored in non-spatial databases. This limits the event information available and how it may be queried. This information may be useful if it can be associated with information available in other databases, perhaps by associating a spatial location with it.

The number and size of the servers presents a large task to query in real-time, as entries and attributes may change often. It may not be practical to require a client device to perform these large database queries. It would be desirable, therefore, to compile this information in advance and perform short queries on an abbreviated data list. Delivery of requested information may be greatly increased, and real-time data may be updated in a timely fashion. Thus, there is a significant need for a method and system for improving database querying so that the potential benefits of associating real-time information with a geographical location can be realized.

SUMMARY OF THE INVENTION

One aspect of the invention provides a method for associating real-time information with a geographical location. A location of interest may be received by a server, and a buffer zone may be determined surrounding that location. Real-time spatial events may be continually updated in one or more GIS databases. The database entries may be software spatial objects, which may consist of the location and supplemental information pertaining to each event. All locations that are related to a spatial event may be listed in a relationship table. The location of interest may be used to query the relationship table for events occurring within the location's buffer zone, and therefore affecting the location.

Another aspect of the invention provides a system for associating real-time information with a geographical location. The system may include means for receiving a location of interest at a server, means for determining a buffer zone surrounding the location, means for creating a relationship table based on real-time event determination, and means for determining spatial events that occur within the buffer zone of the location.

Another aspect of the invention provides a system for associating real-time information with a geographical location. The system may include means for receiving at least one location of interest at a server, means for determining at least one buffer zone based on the at least one location of interest, means for creating at least one relationship table based on spatial events, and means for determining at least one spatial event based on the buffer zone.

Another aspect of the invention provides a computer usable medium including a program for associating real-time information with a geographical location. The program may include computer program code for receiving at least one location of interest, program code for determining a buffer zone surrounding the location, program code for creating at least one relationship table comprising locations and supplementary information pertaining to events, and program code for determining whether real-time events exist within the buffer zone of the location of interest. If one or more events are found within the buffer zone, the program may return the location and supplemental information to the user or applications using the invention.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF A PREFERRED EMBODIMENT

Figure 1:
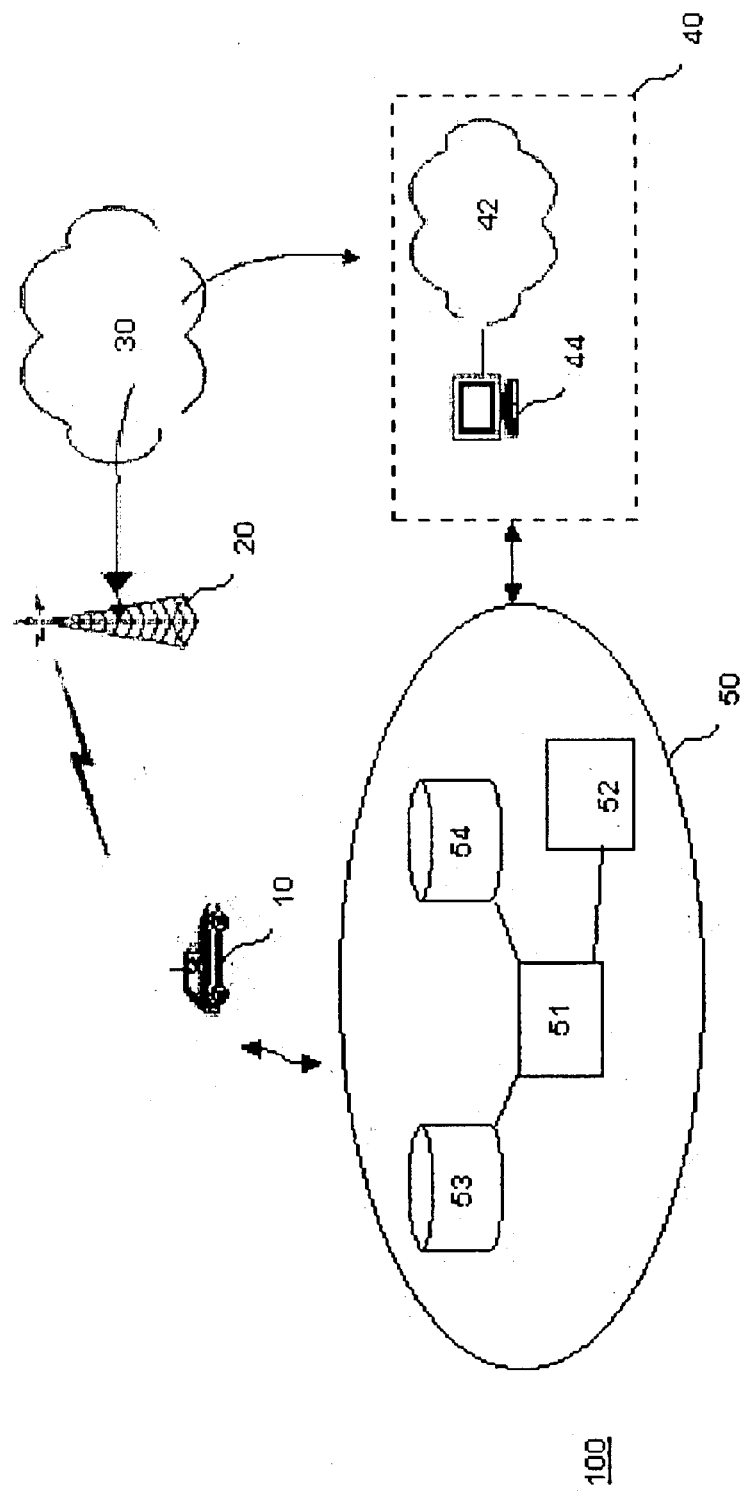
FIG. 1 is a schematic diagram representation of a system for generating navigation information for a vehicle in accordance with the present invention.

FIG. 1 shows one embodiment of a system for providing services to a vehicle in accordance with the present invention at 100. The system 100 may include one or more vehicle clients 10, one or more carrier systems 20, one or more communication networks 30, one or more service management subsystems 40 and one or more navigation subsystems 50. The service management subsystems may comprise one or more service management applications 42 and one or more service managers 44. The navigation subsystems 50 may comprise one or more route applications 51, 52, and one or more coordinate databases 53, 54.

Navigation subsystem 50 is a system for generating routes to be delivered to vehicle client 10 and for receiving route information from vehicle client 10. Navigation subsystem 50 may be connected with or in communication with service management subsystem 40. Service management subsystem 40 may be used to manage the delivery of information to or from navigation subsystem 50 or to other parts of system 100. Routes may be delivered or information may be received via a live agent, such as a human advisor, or via a virtual agent, such as an interactive computer program.

Navigation subsystem 50 may be any suitable hardware or software configuration, or combination of hardware and software that is configured to generate a route, process route information or receive information from vehicle client 10. In one embodiment of the invention, navigation subsystem 50 comprises one or more route applications 51, 52 and one or more coordinate databases 53, 54. For example, route applications 51, 52 may be any suitable software application for generating route information or otherwise processing route information. Coordinate databases 53, 54 may be any suitable databases for storing route information, such as location coordinates.

Vehicle client 10 may be any suitable vehicle. For example, the vehicle may be an automobile or a passenger-carrying unit such as a bus or train. Alternatively, vehicle client 10 may be an occupant of the vehicle or any suitable client device contained in the vehicle. In one embodiment of the invention, vehicle client 10 is a mobile or portable device equipped to communicate with service management subsystem 40.

Carrier system 20 is any suitable system for transmitting a signal from vehicle 10 to service management subsystem 40. Carrier system 20 may also transmit a signal from service management subsystem 40 to vehicle client 10. In one embodiment of the invention, carrier system 20 is a wireless carrier system as is well known in the art. Carrier system 20 may be, for example, a transmitter/receiver unit attached to vehicle client 10. Alternatively, carrier system may be a separate transmitter/receiver carried by vehicle client 10. Communication network 30 is any suitable system for communicating between vehicle client 10 and service management subsystem 40. In one embodiment of the invention, communication network is a public switched telephone network (PSTN). Alternatively, communication network 30 may be a multiprotocol Internet or intranet capable of transmitting voice and/or data in either analog or digital form or a combination of both. Alternatively, communication network 30 may be a hybrid communication network or virtual network.

Service management subsystem 40 is a system for managing a variety of services to be delivered to or from vehicle client 10. In one embodiment of the invention, service management subsystem 40 manages services that are distributable over a variety of channels. For example, services may be delivered via a live agent, such as a human advisor, or via a virtual agent, such as an interactive computer program. The structure of service management subsystem 40 may enable services to be delivered in a uniform manner regardless of the channel used for delivery or of the service being delivered. Service management subsystem 40 may maintain a consistent subscriber experience and "look and feel" across the products being delivered across the service distribution channels enabled.

Service management subsystem 40 may be any suitable hardware or software configuration, or combination of hardware and software that is configured to standardize each service being delivered via the subsystem 40 and to standardize each channel of delivery. In one embodiment of the invention, service management subsystem 40 standardizes each service and channel using personalization information from vehicle client 10. Thus, service management subsystem 40 may have a common profile mechanism across the services being delivered independent of the service distribution channel (live agent, virtual agent; web channel, speech channel) and of the service (news, weather, sports, stocks, navigation instructions, etc.). In one embodiment of the invention, service subsystem includes one or more application components 42 and one or more service managers 44. For example, application 42 may be any suitable software application for managing one or more services. Service managers 44 may be any suitable hardware and/or software configuration or structure for executing applications 42.

Figure 2:
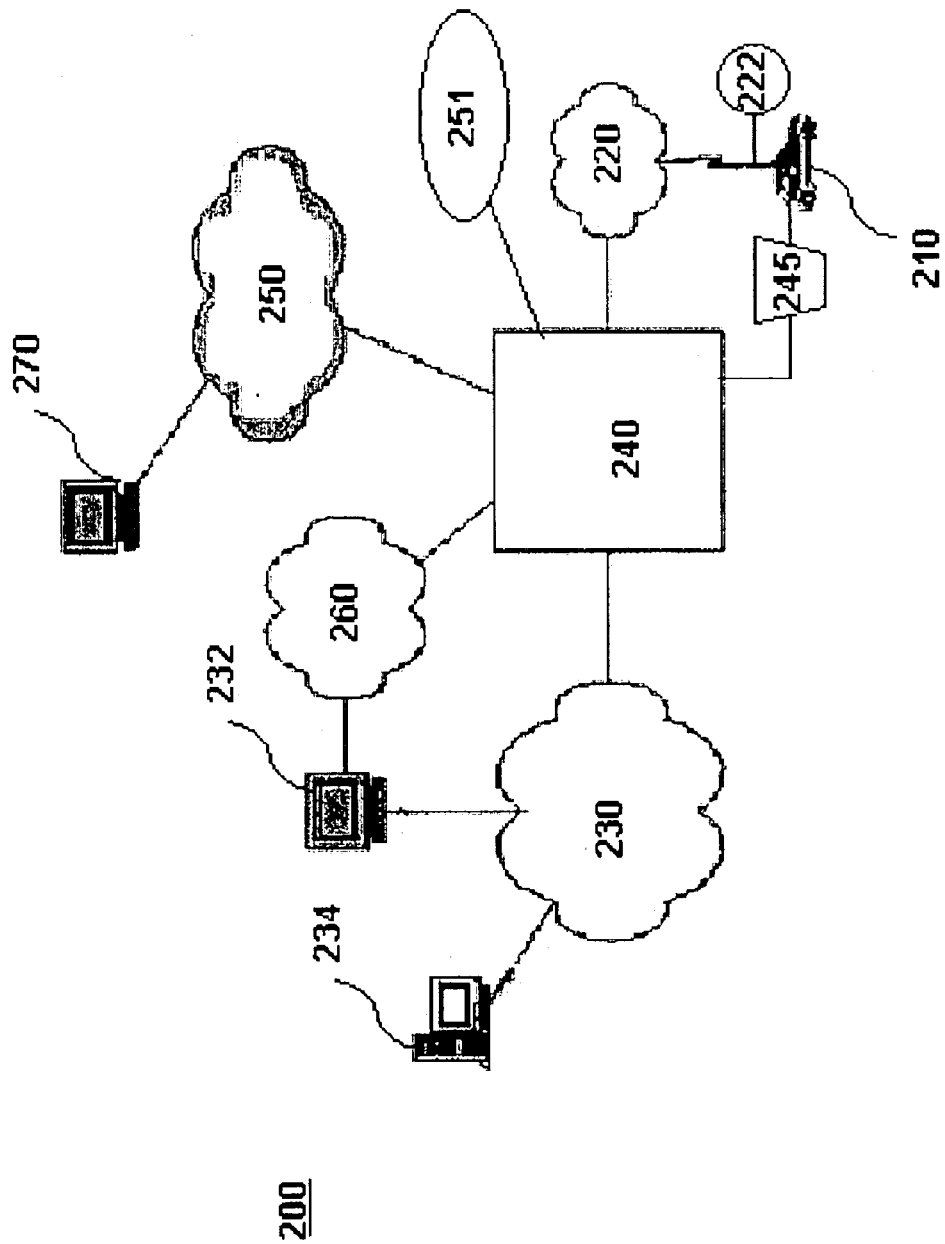
FIG. 2 is a schematic diagram representation of another embodiment of a system for generating navigation information for a vehicle in accordance with the present invention.

FIG. 2 shows another embodiment of a system for providing services to a vehicle in accordance with the present invention at 200. Vehicle-directed service system 200 may include a subscriber 210 and a service management application 240. In the embodiment shown in FIG. 2, the service management subsystem may be in connection with a communication network 230, such as the Internet. Service management application 240 may also be in communication with service applications or other service management subsystems. For example, in FIG. 2, service management subsystem 240 is also in communication with a subsystem for processing route information shown at 251. Service management subsystem 240 may also be in communication with a web-based service application or other web-based service management systems or web servers. For example, in FIG. 2, service management application 240 is in communication with a web channel 260.

In one embodiment of the invention, service management application 240 may include an in-vehicle component 245 of service management subsystem 240. This in-vehicle component may be located in, or on or may be in communication with vehicle client 210. In one embodiment of the invention, the in-vehicle component 245 may install a software algorithm, based on the type of call originated through a voice command, in order to optimize the talk path to subscriber management application 240. System 200 may also allow the subscriber to connect to a live administrator or advisor 270 through a spoken command acknowledged through the subscriber management application 240 voice user interface (VUI).

In one embodiment of the invention, subscriber 210 may have VUI access 222 through a PSTN 220. This may serve as the primary end user interface to service management application 240. This VUI access may allow subscribers in their vehicles equipped in accordance with the present invention to access a variety of services. For example, subscribers 210 may request route information or travel information or may provide information about their route, using voice commands in a conversational manner. Furthermore, the subscriber may have the ability to interrupt or suspend the session if required. In one embodiment of the invention, connections are made to the service management application 240 through the public telephone system. In one embodiment of the invention, subscriber 210 may gain audio access to subscriber management application 240 by activating an in-vehicle speech recognition application. This speech recognition application may allow the subscriber to place hands-free cell phone calls.

Subscriber 210 may also have graphical user interface (GUI) access 232 through a communication network 230, such as the Internet. Such an interface may allow subscribers to access a variety of Internet and communication network-based services in accordance with the present invention. For example, subscriber 210 may access email via this interface. In one embodiment of the invention, subscribers connect to the service management application 240 through the Internet 230 using standard Web browsers.

Subscriber 210 may also have GUI access through a web channel 260. This interface may be used by subscribers to access a variety of services. For example, subscriber 210 may maintain one or more user profiles using web channel 260. Subscriber 210 may also set up user-related rules such as e-mail consolidation and filtering rules. This interface may also be used to access selected content services. Vehicle data, such as diagnostic codes and messages, can be consolidated and displayed using web channel 260. As with other components of system 200, information entered or accessed via web channel 260 may then be incorporated into new products and services for presentation over other channels in communication with service management subsystem 240. The subscribers 210 may connect to the web channel 260 using standard Web browsers. In one embodiment of the invention, standard web channel software interacts with the service management application to update subscriber profiles and/or to obtain information of interest. In one embodiment of the invention, the web channel 260 interface uses a dedicated connection to the service management system 240.

System 200 may also include one or more administrators 270. Administrator 270 may use GUI access to manage service management system 240 and information related to system 200. Administrator 270 may be, for example, a live advisor available to advise subscriber 210. Administrator 270 may also be, for example, an individual maintaining or administering service management subsystem 240. In one embodiment of the invention, administrator 270 accesses service management subsystem 240 via subscriber management subsystem 250. For example, administrator 270 may send configuration and subscriber information to service management system 240. Administrator 270 may also receive notifications of interesting events within system 200. In one embodiment of the invention, subscriber management subsystem 250 uses a dedicated connection between administrator 270 and service management system 240.

As seen in FIG. 2, system 200 may also include one or more message servers 234. These messages may be, for example, voice or text or e-mail mail messages. In one embodiment of the invention, message servers 234 communicate with service management application 240 via Internet 230. Thus, subscribers 210 may receive incoming e-mail messages from, and send outgoing e-mail messages to, external mail transport agents using any suitable messaging protocol as is well known in the art. Message servers 234 may also be used to retrieve subscribers' e-mail from outside mail storage servers for consolidation into their e-mail accounts connected to system 200.

System 200 may also include other services to be delivered in addition to news, weather, sports and finance services as described above. For example, yellow pages listings, special interest content (e.g., movie or restaurant reviews), content related to the location of the vehicle (e.g. travel profiles of nearby tourist attractions) or content related to navigation of the vehicle may all be delivered via system 200.

Figure 3:
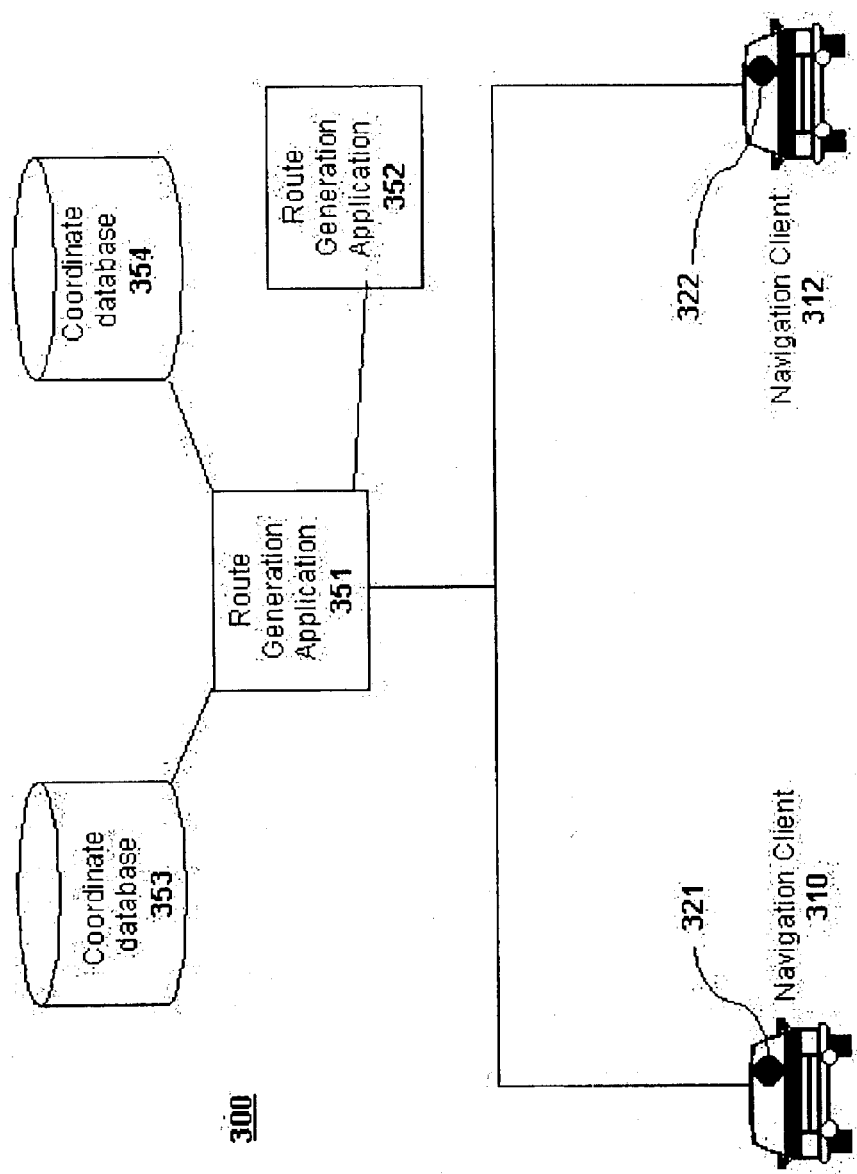
FIG. 3 is a schematic diagram representation of one embodiment of a navigation subsystem in accordance with the present invention.

FIG. 3 shows one embodiment of a navigation system in accordance with the present invention at 300. Navigation system 300 may include one or more navigation clients 310, 312. Each navigation client 310, 312 may have an in-vehicle navigator 321, 322. Navigation system 300 may also include one or more route generation applications 351, 352. Navigation system 300 may also include one or more coordinate databases 353, 354.

Navigation clients 310, 312 may be one or more vehicle clients as described above.

In-vehicle navigator 321, 322 may be any suitable component of navigation client 310, 312 which may be used to navigate vehicle client 310 312. For example, in-vehicle navigator 321, 322 may be a driver. Alternatively, in-vehicle navigator 321, 322 may be an automatic system for navigating vehicle 310, 312.

Route generation applications 351, 352 may be any suitable application for calculating maneuver lists of directions between one or more locations. For example, route generation applications 351, 352 may be any suitable software or hardware programs for managing or calculating routes, portions of route or route coordinates. Route generation applications may include or be able to calculate routes from navigation client's current location to private residences, businesses or recreational facilities. In one embodiment of the invention, route generation applications 351, 352 are in communication with coordinate databases 353, 354.

Route generation applications 351, 352 may generate navigation information in any suitable manner. For example, route generation applications 351, 352 may generate routes using geocoding. That is, the application 351, 352 determines a corresponding latitude and longitude based on an input navigation address. Alternatively, route generation applications 351, 352 may generate routes using reverse geocoding. That is, the application 351, 352 determines a corresponding navigation address based on input latitude and longitude coordinates.

Coordinate databases 353, 354 may be any suitable databases for storing such location coordinates as latitude and longitude of a variety of locations. These locations may be, for example, points of interest. Coordinate databases 353, 354 may also be a database of street addresses. Coordinate databases 353, 354 may also be a database of routes between points.

Figure 4:
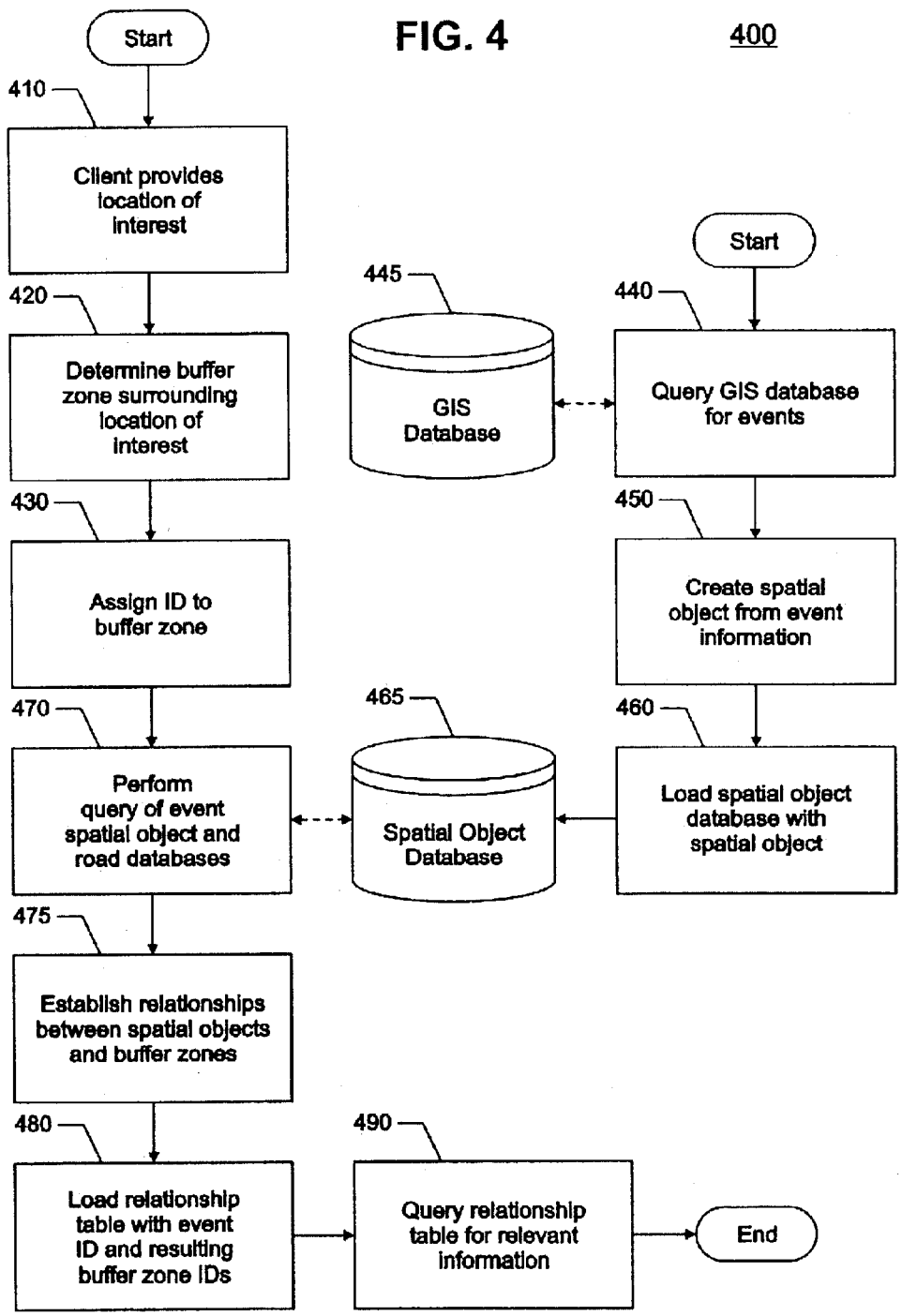
FIG. 4 is a flow chart representation of a preferred embodiment of a method for associating real-time information with a geographical location.

FIG. 4 illustrates a block diagram of a preferred embodiment of a method for associating real-time information with a geographical location in accordance with the present invention at 400. A client 10, 210 may request service via cell phone, the internet, or public switched telephone network (PSTN).

Using the communication network 30, 230 the client provides a server at service management system 40, 240 with at least one location of interest (Block 410). A location of interest may comprise a point location such as a restaurant or street intersection, or a line location such as a road segment. The location of interest may comprise a list of road segments comprising a route. In such a case, each road segment becomes a location of interest.

The client may directly request supplemental information pertaining to a location of interest. Alternatively, a server application may request supplemental information to aid in the execution of a service for the client. For example, a route generation application 51, 52, 351, 352 may request supplemental information pertaining to road segments comprising the route that has been generated in order to determine whether the generated route is optimal. In this case, the supplemental information is returned to the route generation application.

A buffer zone extending from the location of interest is determined (Block 420) by the server at service management system 40, 240. The buffer zone may be of any geometric shape including a circle, square, or any other polygon shape. For the case in which the location of interest comprises a list of road segments, each road segment becomes a location of interest and a buffer zone is determined for each segment.

The server at service management system 40, 240 assigns a unique ID to the buffer zone corresponding to each location of interest for identification (Block 430). The size of each buffer zone may be determined by the client or by a server application 40, 240 for which the information is to be used.

The area of the buffer zone is used to search for spatial objects related to the location of interest. A spatial object comprises the location of an event, and attribute information pertaining to the event. Attribute information comprises supplemental information pertaining to an event and its location. For example, a spatial object may comprise a traffic accident and the location of the accident. The event in this example is the traffic accident. The attribute information in this example may include alternate routes proposed by authorities, and traffic slowdown associated with the accident.

Attribute information associated with a spatial object may comprise any type of desired information associated with the location of the event. Attribute information may include statistics pertaining to the location of interest. For example, a client may wish to know the population density surrounding a shopping mall. This information is available provided at least one available database includes population density information.

One or more Geographical Information System (GIS) databases (Block 445) may be queried (Block 440) for real time spatial events existing within the buffer zone associated with the location of interest. A real-time spatial event comprises an occurrence, object, or statistic of interest. A spatial event can include any real-time event such as, for example, traffic conditions, weather conditions, advertisements, and roadwork. The information returned by the GIS database query pertaining to a real-time event is used to create a software spatial object (Block 450)

A spatial object is created based on the information pertaining to each spatial event (Block 450). The server at service management system 40, 240 assigns an ID to each spatial object created. Each spatial object is then loaded (Block 460) into a spatial object database (Block 465) at the server 40, 240. The spatial object database is updated in real-time as new information becomes available from the GIS databases (Block 445). Updating of the spatial object database (Block 465) occurs on a continual basis, independently of client requests.

Data may be collected from more than one source, such as GIS databases (Block 445). Relevant data is then compiled into a relationship table that can be easily queried for relevant information (Block 490). The relationship table may exist as a database or simply as a file on a server that is updated as required. While a client request causes the server 40, 240 to query the spatial object database (Block 465), the spatial object database is continually updated in real time through queries of the GIS databases (Block 445) made by the server 40, 240.

The GIS databases (Block 445) may be maintained by real-time data suppliers, or may be maintained in part by the server at service management system 40, 240. Any number of GIS databases may be queried by the server for real-time event information.

One or more road segment databases 53, 54, 353, 354 may be queried by the server 40, 240 for the locations of road segments provided by the client (Block 470). These road segment locations may be used in determining buffer zones. The spatial object database (Block 465) is queried by the server for spatial objects located within the buffer zone associated with the location of interest (Block 470).

A relationship table is created and maintained at the server at service management system 40, 240. The relationship table comprises a list of relationships between spatial objects and buffer zones associated with locations of interest for all clients at any given time. The relationship table is updated as new locations of interest are provided, and when old locations of interest are no longer needed.

Relationships between spatial objects and buffer zones associated with the location of interest are established (Block 475) at the server at service management system 40, 240. Relationships are established by determining points where the locations of spatial objects intersect the buffer zone associated with the location of interest. A relationship between a spatial object and the location of interest is then loaded into a relationship table (Block 480) at the server. The relationship table may then be queried by the client or a server application 42, 51, 240, 351 for information relevant to client's requested service.

In one embodiment, buffer zones are also created for spatial objects as well as for each location of interest. For example, a spatial object such as a festival may affect an area much larger than the default buffer zone determined for most locations of interest. In this example, it may be desirable to represent the event as a large area rather than a point or line location. In this embodiment, relationships are established by determining points or areas where spatial object buffer zones intersect the buffer zones associated with locations of interest.

The relationship table lists the IDs of all locations of interest provided by clients, such as road segments in a road network database 53, 54, 353, 354 that are affected by an event. The relationship table also lists the IDs of spatial objects that affect locations of interest. The spatial object IDs listed in the relationship table can be used to query the spatial object database (Block 470) and provide supplemental information pertaining to each event affecting a location of interest. Using this method, each client request requires only a query of the relationship table rather than the much larger GIS databases. The relationship table is used to provide an abbreviated list of entries from the spatial object database. The server at service management system 40, 240 receiving the initial client request performs all database queries and data retrieval, relieving those tasks from the client's hardware. This method of compiling information from potentially multiple servers may significantly increase the range of information and types of information available to the client.

In one example of using the method of 400, a server application may query the spatial object database. Using communication network 30, a client 10, 210 may request a route to be calculated. The service manager 40, 240 may utilize a route generation application 51, 52, 351, 352 to determine a route to reach the destination and provide a list of road segments that comprise the route. Each road segment found on the route becomes a location of interest and assigned its own buffer zone (Block 420, Block 430). The spatial object database (Block 465) is queried for spatial events intersecting each buffer zone (Block 470). Relationships are established by determining points where spatial objects intersect the selected buffer zones associated with the locations of interest (Block 475). The IDs of spatial objects intersecting buffer zones associated with locations of interest are stored in a relationship table (Block 480). The relationship table may be queried for spatial objects that may affect the client's route.

For example, a real-time event such as an automobile accident occurs within the buffer zone of a road segment on the generated route. A query of the spatial object database (Block 470) returns a spatial object with the location of the accident and supplemental information such as excessive traffic slowdown due to the accident. Since the spatial object intersects a buffer zone associated with a location of interest, a relationship is loaded into the relationship table (Block 480). The relationship entry comprises the ID associated with the spatial object created for the accident and the ID associated with the buffer zone determined for the location of interest.

The relationship table provides a list of spatial object IDs and the IDs of the buffer zones they intersect. The spatial object IDs in the relationship table can then be used to quickly retrieve information from the spatial object database (Block 465) for details that may lengthen travel time.

Figure 5:
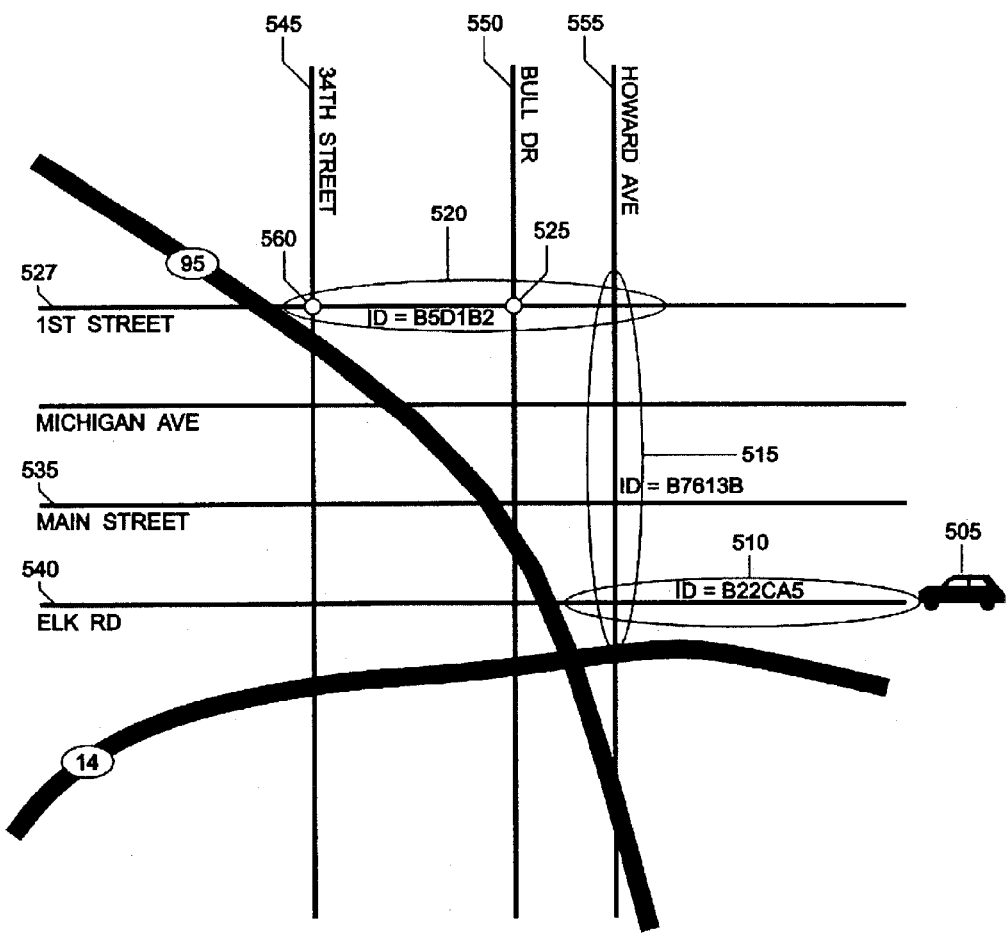
FIG. 5 is map diagram demonstrating the operation of one embodiment of a method for associating real-time information with a geographical location of FIG. 4 in accordance with the present invention.
Figure 6:
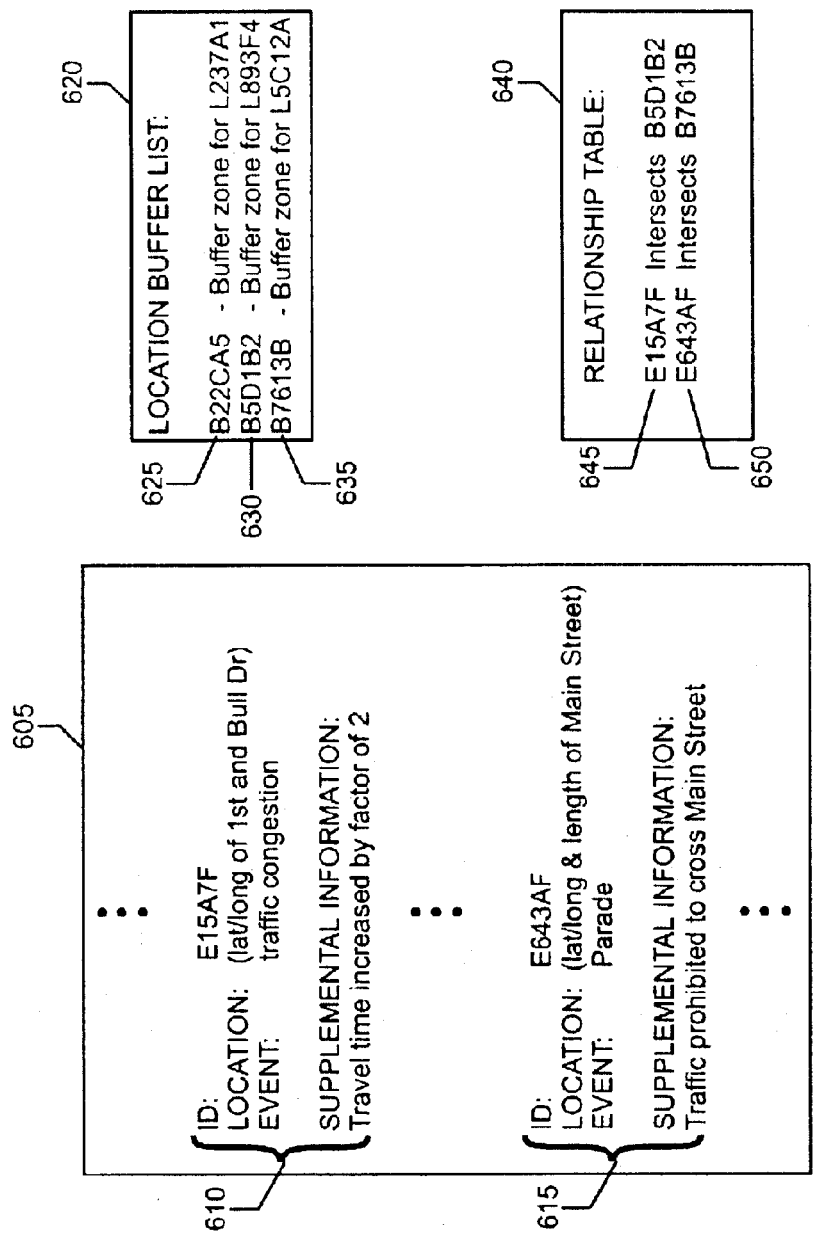
FIG. 6 is a diagram representing the entries of a GIS database, road segment list, and relationship table of the embodiment of FIG. 5.

FIG. 5 and FIG. 6 illustrate an example of one embodiment of a method for associating real-time information with a geographical location in accordance with the present invention in which a server application requests supplemental information. In the example illustrated in FIG. 5 and FIG. 6, a client 505 requests a route to a destination at $1^{st}$ Street and $34^{th}$ Street 560. A route generation application returns a route traversing three road segments. A buffer zone is created for each road segment (Block 420). A unique ID is assigned to each road segment buffer zone (Block 430), 620.

The segment of Elk Rd 540 is assigned a buffer zone 510 with an ID of B22CA5 625. The segment of Howard Ave 555 is assigned a buffer zone 515 with an ID of B7613B 635. The segment of $1^{st}$ Street 527 is assigned a buffer zone 520 with an ID of B5D1B2 630. The server at service management system 40, 240 queries the spatial object database 605. The query returns no spatial objects within the buffer zone of the first segment traversing Elk Rd 540. However, the query reveals a parade in progress on Main Street 535. A spatial object with an ID of E643AF has been created for the parade 615 from a previous GIS database query. The spatial object 615 includes the location of the parade as well as the supplemental information that all traffic is prohibited to cross Main Street 535. The buffer zone 515, 635 intersecting the event causes a relationship 650 to be stored in the relationship table 640. The spatial object database query also reveals traffic congestion 525 at $1^{st}$ Street and Bull Dr 550 within buffer zone 520. A spatial object 610 with an ID of E15A7F exists for the congestion. The spatial object 610 includes the location of the traffic congestion as well as the supplemental information that travel time through that area has doubled. Since a buffer zone 520, 630 intersects the spatial object 525, a relationship is loaded into the relationship table 645. The route generation application may generate a new route based on this supplemental information.

In another embodiment of the invention, the client manually selects locations of interest and corresponding buffer zones. The selections may be made through voice communication with a live administrator 270 or through an Internet based web channel 260. The locations of interest may comprise a list of road segments or a series of geographical locations. The spatial object database is queried for events occurring within the buffer zone list (Block 470). Spatial objects are returned by the spatial object database (Block 465). Relationships are determined between the locations of interest and the buffer areas associated with the locations of interest (Block 475), and are loaded into a relationship table (Block 480). The client can directly specify any type of desired information. The relationship table is then queried for the specified type of information pertaining to the event spatial objects (Block 490). That information is returned to the client by the same means in which it was originally requested. While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A method for associating real-time information with a geographical location comprising:

receiving at least one location of interest at a server;

determining at least one buffer zone based on the at least one location of interest;

creating at least one spatial object based on spatial events;

creating at least one relationship table based on spatial objects; and determining at least one spatial object based on the at least one buffer zone.

2. The method of claim 1 wherein a buffer zone comprises an area surrounding a location of interest to search for IDs of spatial objects related to the location of interest.

3. The method of claim 2 wherein the area of the buffer zone comprises an area reflected by a circle, square, or any other polygon shape.

4. The method of claim 1 wherein a spatial object comprises the location and supplemental information associated with an occurrence, object, or statistic of interest inside the buffer zone.

5. The method of claim 1 wherein a relationship table comprises at least one spatial object ID and at least one buffer zone ID.

6. The method of claim 1 wherein determination of a spatial object is based on performing at least one query of at least one spatial object database.

7. The method of claim 1 wherein a spatial object comprises at least one spatial object ID associated with the at least one location of interest.

8. The method of claim 1 wherein a spatial object comprises real-time information pertaining to traffic density, advertisements, road work, weather conditions, and other events associated with the geographical location of an event.

9. A system for associating real-time information with a geographical location comprising:

means for receiving at least one location of interest at a server;

means for determining at least one buffer zone based on the at least one location of interest;

means for creating at least one relationship table based on spatial objects; and means for determining at least one spatial object based on the at least one buffer zone.

10. The system of claim 9 further comprising means for updating the at least one spatial object as new spatial event information becomes available.

11. A computer usable medium for associating real-time information with a physical location comprising:
- computer readable code to receive at least one location of interest;
- computer readable code to determine at least one buffer zone based on the at least one location of interest;
- computer readable code to create at least one relationship table comprising at least one spatial object ID and at least one buffer zone ID; and
- computer readable code to determine at least one spatial object based on the at least one buffer zone.

12. The computer usable medium of claim 11 wherein a buffer zone comprises an area surrounding an event to search for IDs of events related to the location of interest.

13. The computer usable medium of claim 12 wherein the area of the buffer zone comprises an area reflected by a circle, square, or any other polygon shape.

14. The computer usable medium of claim 11 wherein a spatial object comprises the location and supplemental information associated with an occurrence, object, or statistic of interest inside the buffer zone.

15. The computer usable medium of claim 11 wherein a relationship table comprises at least one spatial object ID and at least one buffer zone ID.

16. The computer usable medium of claim 11 wherein determination of a spatial object is based on performing at least one query of at least one spatial object database.

17. The computer usable medium of claim 11 wherein a spatial object comprises at least one spatial object ID associated with the at least one buffer zone associated with at least one location of interest.

18. The computer usable medium of claim 11 wherein a spatial object comprises real-time information pertaining to traffic density, advertisements, road work, weather conditions, and other events associated with the geographical location of an event.

* * * * *